(12) United States Patent
Crawmer

(10) Patent No.: US 9,170,057 B2
(45) Date of Patent: Oct. 27, 2015

(54) EVACUATED TUBES FOR SOLAR THERMAL ENERGY COLLECTION

(75) Inventor: Donald L. Crawmer, Pennville, IN (US)

(73) Assignee: Thermal Resource Technologies, Inc., Carmel, IN (US)

( * ) Notice: Subject to any disclaimer, the term of this patent is extended or adjusted under 35 U.S.C. 154(b) by 669 days.

(21) Appl. No.: 13/396,707

(22) Filed: Feb. 15, 2012

(65) Prior Publication Data

US 2012/0204860 A1 Aug. 16, 2012

Related U.S. Application Data

(60) Provisional application No. 61/443,494, filed on Feb. 16, 2011.

(51) Int. Cl.
| | | |
|---|---|---|
| F24J 2/00 | (2014.01) | |
| F28D 15/02 | (2006.01) | |
| F24J 2/32 | (2006.01) | |
| F24J 2/05 | (2006.01) | |
| F24J 2/46 | (2006.01) | |

(52) U.S. Cl.
CPC .................. F28D 15/02 (2013.01); F24J 2/055 (2013.01); F24J 2/32 (2013.01); F24J 2/4647 (2013.01); *F24J 2002/4601* (2013.01); *Y02E 10/44* (2013.01)

(58) Field of Classification Search
CPC ....................................................... F24J 2/055
USPC .......................................................... 126/635
See application file for complete search history.

(56) References Cited

U.S. PATENT DOCUMENTS

| | | | | |
|---|---|---|---|---|
| 4,033,327 A | * | 7/1977 | Pei ................................ | 126/608 |
| 4,067,315 A | * | 1/1978 | Fehlner et al. ................ | 126/636 |
| 4,080,954 A | * | 3/1978 | de Wilde et al. .............. | 126/655 |
| 4,217,882 A | * | 8/1980 | Feldman, Jr. .................. | 126/636 |
| 4,362,025 A | * | 12/1982 | Theakston ...................... | 62/148 |

(Continued)

FOREIGN PATENT DOCUMENTS

| | | |
|---|---|---|
| EP | 0 025 305 A1 | 3/1981 |
| EP | 0 119 046 A2 | 9/1984 |

(Continued)

*Primary Examiner* — Avinash Savani
*Assistant Examiner* — Deepak Deean
(74) *Attorney, Agent, or Firm* — E. Victor Indiano; Indiano Law Group, LLC

(57) ABSTRACT

An evacuated tube solar thermal collector uses a set of evacuated solar thermal collector tubes in heat exchanging contact with a fluid flowing through a header tube. Two heat pipes are provided in each evacuated thermal collector tube, and the condenser ends of the heat pipes are positioned in the header tube with a spacing that provides improved heat transfer from the heat pipes to the header tube. When 14 mm heat pipes contained in 58 mm collector tubes are used in a header tube having a capacity of about 0.5 gallons with a heat transfer liquid that is flowing at a rate of about 0.3 gpm, the spacing between heat pipes in each collector tube is about 24 mm, center to center, and the spacing between corresponding heat pipes of immediately-adjacent collector tubes is about 80 mm.

8 Claims, 10 Drawing Sheets

(56) References Cited

U.S. PATENT DOCUMENTS

| | | | |
|---|---|---|---|
| 4,474,170 A * | 10/1984 | McConnell et al. | 126/636 |
| 4,505,261 A * | 3/1985 | Hunter | 126/635 |
| 4,675,783 A * | 6/1987 | Murase et al. | 361/699 |
| 4,686,961 A * | 8/1987 | Garrison | 126/635 |
| 7,413,976 B2 * | 8/2008 | Shih et al. | 438/637 |
| 8,459,250 B2 * | 6/2013 | Lowenstein | 126/636 |
| 2009/0107487 A1 * | 4/2009 | Gee et al. | 126/635 |
| 2010/0108055 A1 * | 5/2010 | Davis et al. | 126/663 |
| 2010/0199973 A1 * | 8/2010 | Hook | 126/610 |
| 2011/0203572 A1 * | 8/2011 | Jackman | 126/591 |
| 2011/0253127 A1 * | 10/2011 | Lowe et al. | |
| 2011/0303216 A1 * | 12/2011 | Lowenstein | 126/636 |
| 2012/0048519 A1 * | 3/2012 | Gruss et al. | 165/104.26 |
| 2012/0073567 A1 * | 3/2012 | Winston | 126/652 |
| 2012/0124999 A1 * | 5/2012 | Gruss et al. | 60/641.8 |

FOREIGN PATENT DOCUMENTS

| | | |
|---|---|---|
| EP | 0 119 046 A3 | 9/1984 |
| EP | 0 250 487 B1 | 2/1991 |
| EP | 1 541 936 A1 | 6/2005 |
| WO | WO 81/00615 A1 | 3/1981 |
| WO | WO 87/03950 A1 | 7/1987 |
| WO | WO 98/49501 A1 | 11/1998 |
| WO | WO 99/30089 A1 | 6/1999 |
| WO | WO 99/64795 A1 | 12/1999 |
| WO | WO 03/023292 A1 | 3/2003 |
| WO | WO 2004/111549 A1 | 12/2004 |
| WO | WO 2005/088208 A1 | 9/2005 |
| WO | WO 2007/148067 A2 | 12/2007 |
| WO | WO 2009/007898 A2 | 1/2009 |
| WO | WO 2010040137 A1 * | 4/2010 |

* cited by examiner

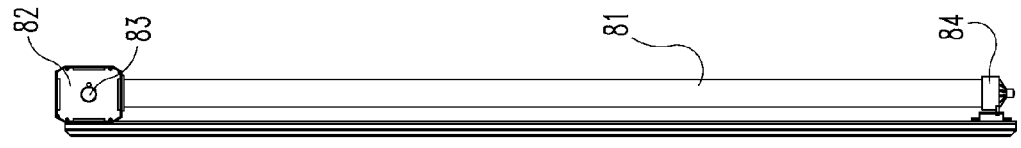
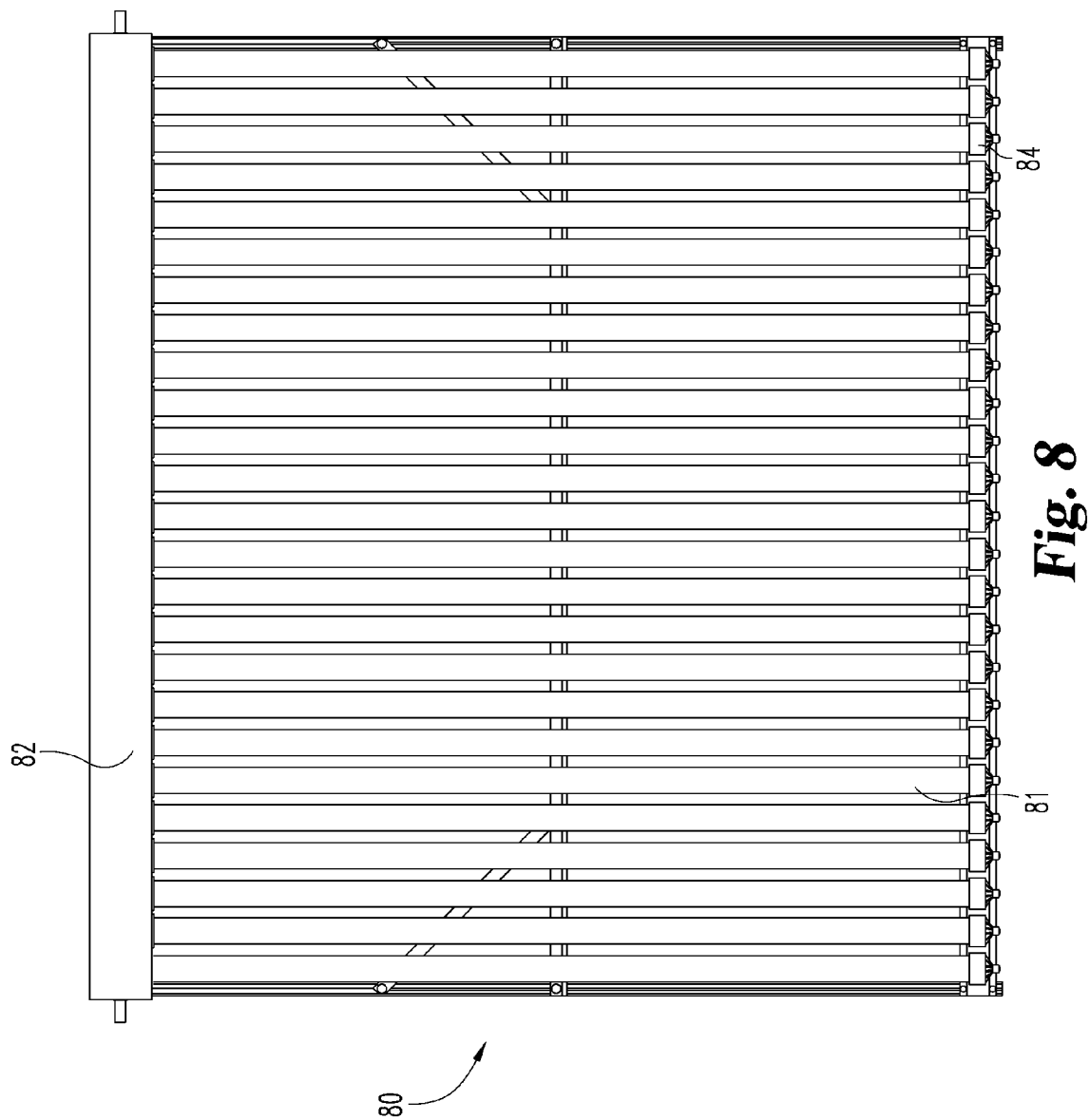

_US 9,170,057 B2_

EVACUATED TUBES FOR SOLAR THERMAL ENERGY COLLECTION

REFERENCE TO RELATED APPLICATIONS

The present application claims the benefit of U.S. Provisional Patent Application No. 61/443,494, filed Feb. 16, 2011, the entire contents of which are hereby incorporated herein by reference.

FIELD OF THE INVENTION

The present invention relates generally to solar energy collectors, and more particularly to a device that uses solar thermal evacuated tubes to convert solar energy to thermal energy.

BACKGROUND OF THE INVENTION

Evacuated tubes for solar thermal energy collection typically contain an outer tube and an inner heat pipe. The outer tube has two walls, and a heat absorbing material coats the inside of the inner wall. The space between the walls is evacuated to prevent heat loss from the inner wall to the environment outside the tube. The inner heat pipe is hollow, and the space inside the pipe is substantially evacuated except for a small quantity of liquid, such as alcohol or water, that is contained inside the inner heat pipe.

Sunlight shining on the tube passes through the transparent outer wall and heats the heat absorbing material on the inner wall of the tube. The heat absorbed by the heat absorbing material is not lost to the environment, and instead heats the heat pipe. This causes the liquid in the heat pipe to vaporize and rise to the top of the pipe. A heat transfer fluid, such as water or glycol, flows through a header tube around the upper ends of the heat pipes and absorbs heat from the heat pipe vapor. The loss of heat from the vapor to the heat transfer fluid causes the vapor in the heat pipe to condense and flows back down into heating portion of the heat pipe. As the process repeats, solar energy continues to be absorbed by the heat pipes, used to vaporize the heat pipe fluid, and transferred from the heat pipes to the heat transfer fluid in the header as the heat pipe vapor condenses. The efficiency with which heat is transferred from the heat pipes to the header fluid is one determinant of the efficiency of the device.

A need exists for solar thermal energy collectors having improved heat transfer between the heat pipes and the header fluid. The present invention addresses that need.

SUMMARY OF THE INVENTION

Briefly describing one aspect of the present invention, there is provided an evacuated tube solar thermal collector having a plurality of evacuated thermal collector tubes and a header tube.

The evacuated thermal collector tubes each preferably comprise:
  a) an outer wall having an outer diameter of about 58 mm;
  b) an inner wall defining an inner tube space;
  c) an evacuated space between the outer wall and the inner wall; and
  d) a set of at least two heat pipes positioned in the inner tube space.

A heat-absorbing material is preferably provided on the inner wall of each collector tube. The vacuum space between the inner and outer walls creates a thermal barrier and causes the heat absorbed by the inner wall to be retained in the inner tube space and not to be lost to the environment outside the tube.

The heat pipes each preferably comprise:
  a) a pipe wall defining an inner pipe space and having an upper, condenser end and a lower, heating end; and
  b) a vaporizing/condensing fluid in the inner pipe space.
The inner space of each heat pipe may be at a low pressure to allow the vaporizing/condensing fluid in the inner space to boil at a lower temperature than it would boil if the pressure were not low.

The header tube preferably comprises:
  a) a tube capable of holding between about 0.4 gallons and about 0.7 gallons of a heat transfer fluid, and being open at each end to allow a heat transfer fluid to flow therethrough;
  b) a series of sockets sized to receive the condenser ends of heat pipes; and
  c) a heat transfer liquid in the header tube.
The header tube may be covered by an insulated cover substantially surrounding the header tube and effective for limiting heat loss from the header tube to the environment. The sockets in the header tube are preferably spaced to promote heat transfer from the heat pipes to the header tube. In one embodiment using 14 mm heat pipes in 58 mm collector tubes, the preferred spacing is about 24 mm (center-to-center) between the sockets for the two heat pipes of each collector tube, and 80 mm (center-to-center) between the lead sockets of immediately-adjacent collector tubes. It is believed that the preferred spacing is effective to provide robust and somewhat turbulent fluid flow around each of the heat pipes when a heat transfer fluid flows through the header tube at a flow rate of between about 0.2 gpm and about 0.4 gpm.

BRIEF DESCRIPTION OF THE DRAWINGS

FIG. 8 is a front elevational view of the evacuated thermal collector tubes and the housing assembly of the present invention, according to one disclosed embodiment.

FIG. 9 is a side elevational view of the evacuated thermal collector tubes and the housing assembly of the present invention, according to one disclosed embodiment.

DESCRIPTION OF THE PREFERRED EMBODIMENTS

Figure 1:
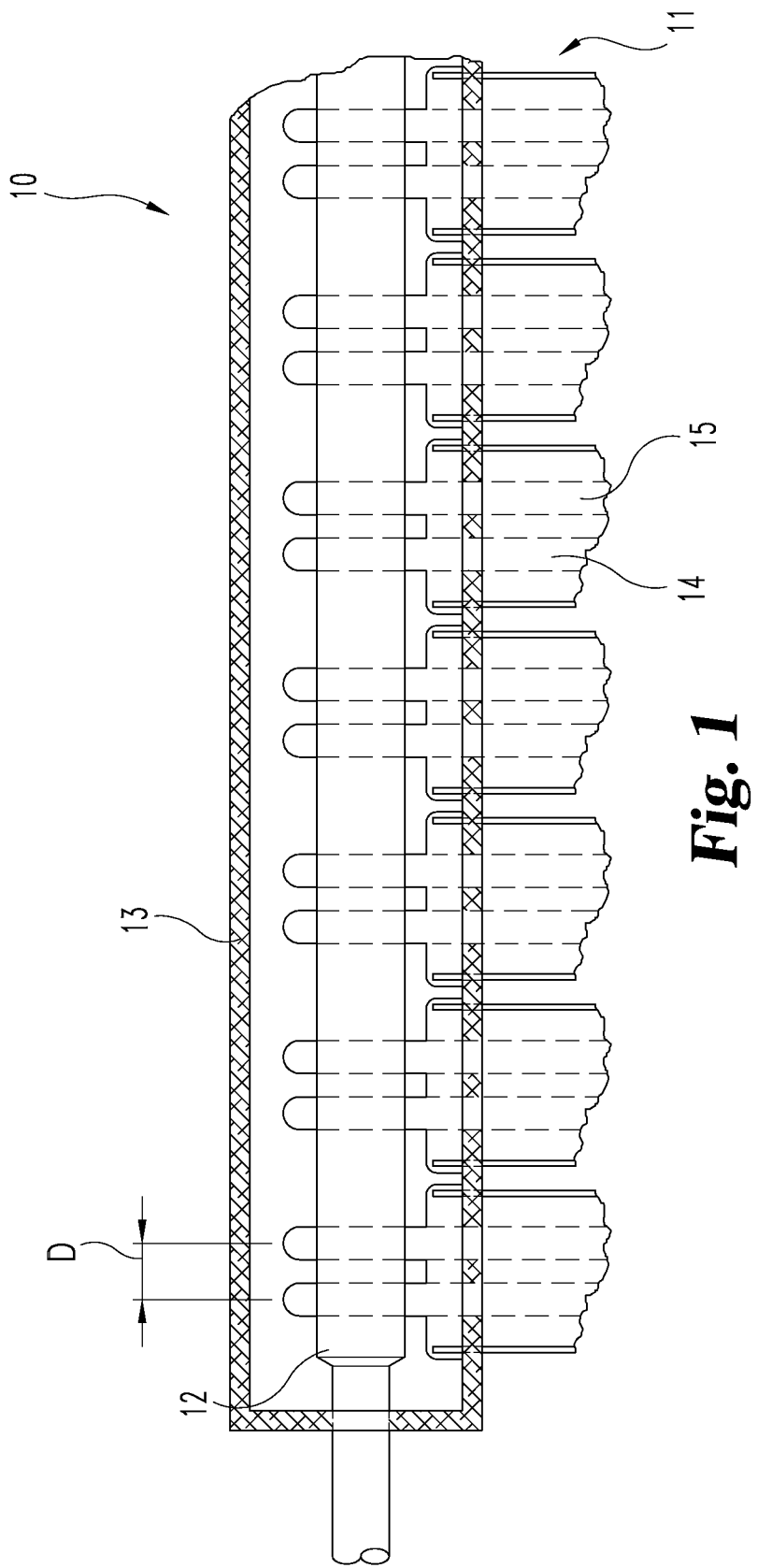
FIG. 1 is a side elevational view, in partial section, of the evacuated thermal collector tubes of the present invention, with the condenser ends disposed in the header tube, according to one disclosed embodiment.

For the purposes of promoting an understanding of the principles of the invention, reference will now be made to certain embodiments and specific language will be used to describe the same. It will nevertheless be understood that no limitation of the scope of the invention is thereby intended, such alterations and further modifications of the disclosed method and/or device being contemplated as would normally occur to one skilled in the art to which the invention relates.

As indicated above, one aspect of the present invention relates to an evacuated tube solar thermal collector. The collector includes a plurality of evacuated thermal collector tubes, with heat pipes in each tube, and a header tube. The evacuated thermal collector tubes hold heat pipes that collect heat energy from the sun and pass that heat to a heat transfer fluid flowing through the header tube.

In certain preferred embodiments each evacuated thermal collector tube comprises an outer wall having an outer diameter of about 58 mm, an inner wall defining an inner tube space, and an evacuated space between the outer wall and the inner wall to inhibit heat flow from the collector tube. The outer wall is clear to allow sunlight to pass through, and the inside of the inner wall is coated with a material that absorbs heat energy from the sun.

A set of at least two heat pipes is positioned in each inner tube space. Each of the heat pipes typically has a pipe wall defining an inner pipe space, and a vaporizing/condensing fluid is provided in the inner pipe space. The upper end of each heat pipe is preferably expanded to provide a condenser portion, and the remainder of the pipe collects heat from the collector tube and uses that heat to heat and vaporize the fluid in the heat pipe. The interior space of each heat pipe may be partially evacuated so that the pressure is reduced, thus facilitating the vaporization process.

In certain preferred embodiments the header comprises a header tube holding between about 0.4 gallons and about 0.7 gallons of a heat transfer fluid. The header tube is preferably open at each end to allow a heat transfer fluid to flow therethrough, and has a series of sockets sized to receive the condenser ends of said heat pipes. An insulated cover substantially surrounds the header tube.

The condenser ends of the heat pipes are positioned in the header tube at a distance effective to provide improved heat transfer from the heat pipes to the header tube. It is believed that the optimal spacing provides some amount of turbulent fluid flow between the pipes in each heat pipe set when a heat transfer fluid flows through the header tube at a flow rate of between about 0.2 gpm and about 0.4 gpm. When 14 mm heat pipes are used in a 58 mm collector tube, the optimal spacing is about 24 mm.

1. The Evacuated Thermal Collector Tubes.

While evacuated thermal collector tubes are generally known to the art, the evacuated thermal collector tubes of the present invention differ from prior art tubes in several ways. First, the evacuated thermal collector tubes of the present invention preferably each contain at least two heat pipes. Prior art evacuated thermal collector tubes typically contain only one heat pipe. Second, the two heat pipes of the evacuated thermal collector tubes of the present invention are spaced apart a distance effective to provide improved heat transfer to the header tube fluid.

The evacuated thermal collector tubes typically comprise a double-walled construction with a vacuum between the two walls. The evacuated space provides a barrier to heat transfer from the inside tube wall to the outside of the tube, thus reducing heat loss from the heat pipes to the environment.

The outer wall is preferably made of a material that is substantially transparent to allow sunlight to pass through the outer wall and to heat the heat-absorbing material on the inner wall of the tube. Borosilicate glass is commonly used for the outer tube construction.

The inner wall of the collector tube may also be made of a transparent material, but the inside of the tube is coated with a heat-absorbing material. This allows the inner tube and the area inside the inner tube to get very hot as sunlight passing through the outer wall heats the inner wall and is prevented by the vacuum space from being lost to the environment.

The collector tube walls preferably join at the bottom to provide a closed end. Alternatively, a separate bottom wall may be provided. The tubes are preferably open at the top where the tube fits into the header socket. Thus, the header socket provides the structure that closes the upper end of the tube when the tubes are installed in the header.

In one embodiment the evacuated thermal collector tubes have an outer diameter of about 58 mm. Tubes with a smaller or larger diameter may be used in some embodiments, such at tubes with a 47 mm outer diameter or even a 100 mm outer diameter. The length of the tube is variable depending on the amount of sunlight that is desired to collect, with a length of about 1800 mm being used in the most preferred embodiment.

Inside each tube are heat pipes. In the most preferred embodiment there are two heat pipes in each tube, but more than two heat pipes may be used in other embodiments. The heat pipes are preferably made of copper or another material that easily absorbs heat from the inner collector tube surface. This allows the heat pipe to get hot enough to "boil" a liquid inside the heat pipe, thus converting that liquid to its vapor state. The vaporized fluid rises in the heat pipe until it reaches the top of the tube where it indirectly contacts a heat transfer liquid flowing though the header. The heat transfer liquid "pulls" heat from the vapor, causing the vapor to condense and fall back into the heating/vaporizing portion of the tube. As the fluid vaporizes in the heating/vaporizing portion of the heat pipe, and subsequently condenses in the cooling/condensation portion of the heat pipe, solar energy is converted to heat energy and is transferred to the heat exchange fluid flowing through the header.

In one embodiment the heat pipes have a nominal outside diameter of about 14 mm at the condenser end (more particularly about 13.9 mm) and a diameter of about 9 mm along the heating portion of the pipe. Preferred heat pipes are nominally about 1800 mm long (more particularly about 1780 mm), although other diameters and/or lengths may be used.

The heat pipes are preferably closed so that the interior of the pipe can be kept at a reduced pressure. The reduced pressure inside the heat pipe allows the fluid in the pipe to boil at a lower temperature that it would otherwise boil. Preferably the pressure inside the heat pipe is less than 1 atmosphere when the tube is at ambient temperature of about 22° C.

One end (the "top" end) of each heat pipe is preferably expanded to provide a condenser region with a larger diameter than the diameter of the heating/vaporizing region of the pipe. The expanded condenser end allows the vapor to cool and condense on the outside surface of the condenser, and to flow back into the heating/vaporizing portion of the heat pipe without undesirably cooling other fluid in the pipe before that fluid can transfer its heat to the header tube fluid.

In one embodiment the evacuated tubes may be made using the materials and/or methods disclosed by U.S. Pat. No. 6,132,823, which is hereby incorporated herein by reference. Such tubes are available from Linuo Solar Thermal Division, Jinan, China.

2. The Header Tube and Header Assembly.

A header tube is used to absorb heat from the evacuated thermal collector tubes and to transfer that heat to another location. The header tube is preferably open at each and has a fluid flowing it. The fluid in the header tube is preferably a mixture, and most preferably a 50:50 mixture, of water and propylene glycol. As the fluid passes over the condenser ends of the heat pipes, heat is drawn from the heat pipes and is transferred to the header fluid.

A series of sockets may be provided in the header tube to receive the condenser ends of the heat pipes. These sockets allow the heat pipes to indirectly contact the header fluid while avoiding leaking of that fluid from the header tube. Accordingly, the sockets are preferably sized to provide a snug fit around the condenser end. In addition, a heat transfer "grease" may be provided in the sockets to improve the heat transfer from the heat pipe to the header tube.

The sockets are spaced apart at a distance effective for improving heat transfer from the heat pipes to the header tube fluid. When the header tube has a heat transfer portion sized to hold about 0.5 gallons of heat transfer liquid, and when the sockets are sized to have an inner diameter of about 14 mm, the spacing between the two sockets of each socket pair (i.e, between the socket that receives the condenser end of the first heat pipe in a heat pipe pair, and the socket that receives the condenser end of the second heat pipe of that same heat pipe pair) is about 24 mm, center to center. Similarly, the spacing between corresponding sockets of each immediately-adjacent socket pair (i.e, between the first socket of one socket pair and the first socket of the next socket pair) is about 80 mm, center to center. Accordingly, the spacing between the second socket of one socket pair and the first socket of the immediately-following socket pair is about 56 mm, center to center.

The header tube is preferably insulated with an insulation material contained in a header housing. In some embodiments the insulation material is a fiberglass insulation, while in other embodiments the insulation is a polyurethane foam. Preferably a combination of milled fiberglass and polyurethane foam is used.

The header housing may be made of metal, such as aluminum.

3. The Vaporization/Condensation Heat Transfer Cycle.

As previously described, sunlight heats the heat pipes and causes the fluid contained therein to vaporize ("boil"). The vapor rises to the condenser portion of the heat pipe where it indirectly contacts the fluid flowing through the header tube. By "indirectly contacts" it is meant that the two fluids do not contact each other directly, but the two tubes containing the two fluids are in close enough proximity for heat to transfer readily from the fluid in the heat pipe to the fluid in the header tube. Typically, there is physical contact between the heat pipe and the header tube sockets, with that contact being facilitated by the use of a heat transfer grease in the socket.

When the hot vapor in the heat pipe indirectly contacts the fluid flowing through the header tube, heat is drawn from the heat pipe vapor to the header tube fluid, this heating the header tube fluid and cooling the heat pipe fluid. The cooled heat pipe fluid is cooled enough to condense back to its liquid state, where is flows down the sides of the condenser end and back toward the heating portion of the heat pipe. As the condensed fluid flows back into the hot heat pipe it again vaporizes and the cycles continues.

It is to be appreciated that the vaporization/condensation cycle occurs primarily near the upper end of the heat pipe. The lower portion of the heat pipe is primarily a heat collection zone where sunlight heats the heat pipe so that it gets hot enough to vaporize the liquid contained therein.

4. The Heat Pipe Spacing.

To the extent prior evacuated tube thermal collectors may have used multiple heat pipes, it is believed that the spacing between the heat pipes was not manipulated to provide improved heat transfer to the header liquid. The present inventor has surprisingly found that a specific spacing of the heat pipes in the header tube improves the transfer of heat from the heat pipes, and provides heat transfer benefits not achieved by prior art devices.

One aspect of the present invention provides a spacing of the heat pipes that provides a fluid flow around each tube that promotes efficient heat transfer from the heat pipes to the header tube fluid. In that regard it has been found that if the heat pipes are too far apart or too close together the heat transfer is not efficient compared to the efficient-transfer spacing. Without wishing to be bound by theory, it is believed that if the heat pipes are too close together the flow around second or subsequent pipes is inhibited by the first pipe which blocks or shields the second or subsequent pipe. Similarly, if the heat pipes are too far apart, the flow around the second or subsequent pipes may not be turbulent enough as simple, laminar flow surrounds the second pipe. Moreover, a wider spacing may reduce the number of tubes that will fit in a particular header tube space.

For the purposes of this disclosure the flow of liquid in the header tube will be referred to as "laminar" when the fluid flows in a substantially straight line. To the extent the fluid flows in layers, the layers are parallel with few or no disruptions between the layers. Similarly, for the purposes of this disclosure the flow of liquid in the header tube will be referred to as "turbulent" when the fluid flows in curved direction as the fluid passes around and past the heat pipes. This turbulent flow may be characterized by recirculation, eddies, and apparent randomness, but the principal characteristic is that the fluid flow is not straight.

Accordingly, it can be seen that a fluid flowing around a single heat pipe will have a fluid flow path characterized by substantially straight (i.e, laminar) flow in front of the pipe (the direction from which the liquid is flowing, and a zone of substantially turbulent flow immediately behind the pipe. As the fluid continues past the pipe, the flow will become laminar again.

When there are two heat pipes in the fluid flow path the flow of liquid around the pipes depends on the spacing between the pipes. If the spacing is very close, the zone of turbulent flow behind the first pipe is abbreviated by the zone of turbulence caused by the second pipe. This may keep some or all of the fluid from flowing completely around the second tube, which limits heat transfer from the pipe to the liquid.

Similarly, when the spacing between the pipes is far apart, there is a substantial zone of laminar flow (LF) following each zone of turbulent flow (TF). This may reduce heat transfer from the second pipe since the flow around the front of the pipe is substantially laminar. Moreover, it may limit the total heat transferred if a fewer number of pipes fits in the flow path.

It is believed that the present invention improves heat transfer by spacing a set of two or more heat pipes such that the zone of turbulent flow behind the first pipe is substantially complete and not abbreviated to the extent that full and turbulent fluid flow does not occur around the second pipe. Moreover, it is believed that there is essentially no zone of laminar flow following the zone of turbulent flow following each "first" heat pipe. This allows the flow around each "second" heat pipe to be somewhat turbulent, yet complete, thus providing superior heat transfer from the heat pipes to the header fluid.

Accordingly, in testing to date it has been found that a 24 mm spacing between the two 14 mm condenser ends of a heat pipe pair provides improved heat transfer from the heat pipes to the header fluid when a heat transfer fluid flows through the header tube at a flow rate of between about 0.2 gpm and about 0.4 gpm, and more particularly when the heat transfer fluid flows through the header tube at a flow rate of about 0.3 gpm 5. Reference to the Drawings.

Referring now to the drawings, FIG. 1 is a side elevational view, in partial section, of the evacuated thermal collector tubes of the present invention, according to one potential embodiment, with the condenser ends disposed in the header tube. Collector 10 includes evacuated thermal collector tubes 11 and header tube 12. The header tube 12 is enclosed in an insulated housing 13. Each evacuated thermal collector tube 11 has a pair of heat pipes 14, 15, extending from the end of the tube. The heat pipes are spaced a distance D that is effective for promoting good heat transfer from the heat pipes to the liquid flowing through header tube 12. In the illustrated embodiment, the condenser end sockets are about 14 mm in diameter, and the distance D is about 24 mm.

Figure 2:
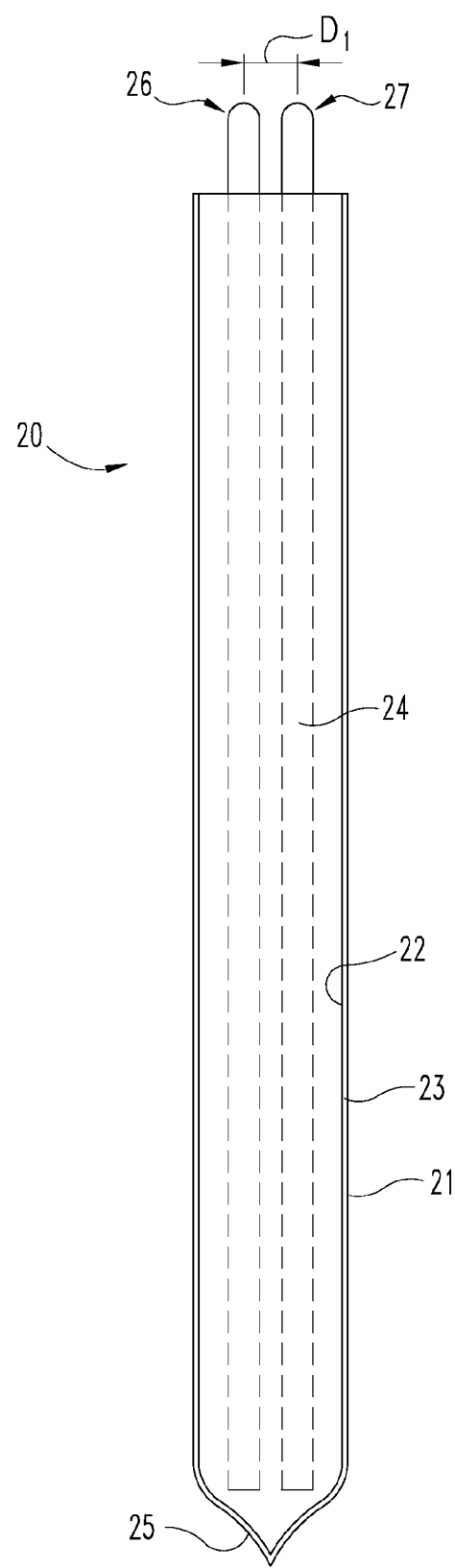
FIG. 2 is a side elevational view of the evacuated thermal collector tubes of the present invention according to one disclosed embodiment.

FIG. 2 is a side elevational view of the evacuated thermal collector tubes of the present invention according to one disclosed embodiment. Collector tube 20 includes an outer wall 21, an inner wall 22, and an evacuated space 23 between the outer wall and the inner wall. This evacuated space is effective to create a thermal barrier and cause heat from the inner wall to be retained in the space 24 inside the collector tube and not to be lost to the environment outside the tube. Walls 21 and 22 may join at the bottom in a "teardrop" shape to provide a bottom wall 25.

A set of at least two heat pipes 26, 27, is positioned in the inner tube space 24. The pipes are spaced apart by a distance $D_1$ effective for providing good heat transfer from the heat pipes to the liquid flowing through a header tube. In the illustrated embodiment the condenser ends have an outer diameter of about 14 mm, and the distance $D_1$ is about 24 mm.

Figure 3:
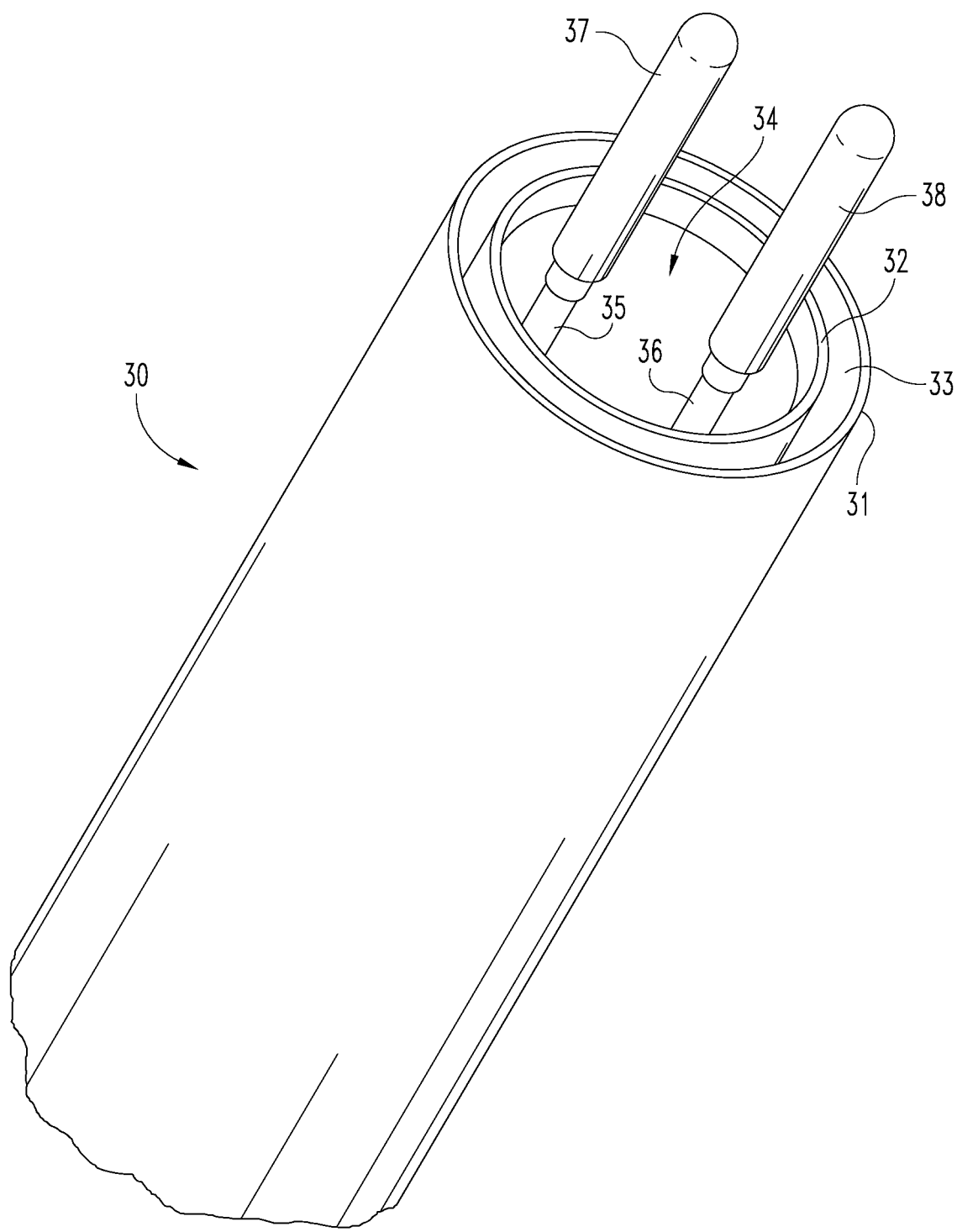
FIG. 3 is a perspective view of the condenser end of the evacuated thermal collector tubes of the present invention according to one disclosed embodiment.

FIG. 3 is a perspective view of the condenser end of the evacuated thermal collector tubes of the present invention according to one disclosed embodiment. Collector 30 includes an outer wall 31 and an inner wall 32, with an evacuated space 33 between the walls. Inner wall 32 defines a space 34 that is heated as heat collected by inner wall 32 is prevented from leaving the tube by vacuum space 33. Heat pipes 35 and 36 are positioned in inner space 34, and terminate in condenser ends 37 and 38, respectively.

Figure 4:
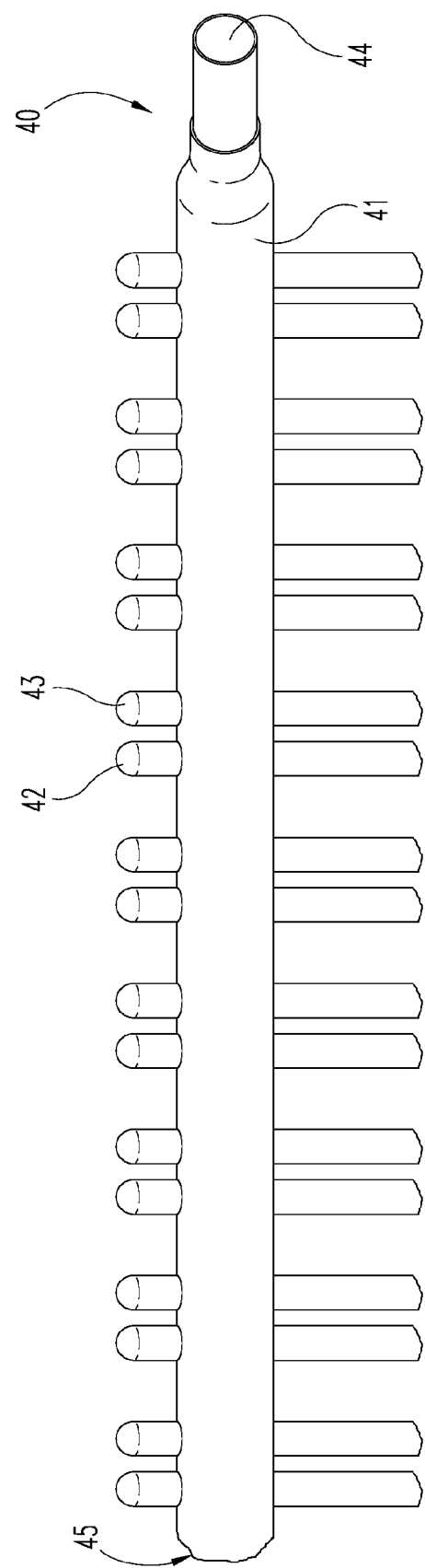
FIG. 4 is a perspective view of the header tube of the present invention according to one preferred embodiment.

FIG. 4 is a perspective view of the header tube of the present invention according to one preferred embodiment. Header tube 40 includes a heat exchange tube portion 41 with a series of sockets 42 and 43 spaced along the tube. The sockets are preferably spaced in pairs, as illustrated, to match the two heat pipes in each collector tube. The header tube 40 has open ends 44 and 45 to allow a heat transfer fluid to flow through the tube.

In the illustrated embodiment the header tube has a heat transfer portion sized to hold about 0.5 gallons of heat transfer liquid, and the illustrated sockets are sized to have an inner diameter of about 14 mm. The spacing between the two sockets of each socket pair (i.e, between the socket that receives the condenser end of the first heat pipe in a heat pipe pair, and the socket that receives the condenser end of the second heat pipe of that same heat pipe pair, such as the spacing between sockets 42 and 43) is about 24 mm, center to center. Similarly, the spacing between corresponding sockets of each immediately-adjacent socket pair (i.e, between the first socket of one socket pair and the first socket of the next socket pair) is about 80 mm, center to center. Accordingly, the spacing between the second socket of the first illustrated socket pair and the first socket of the immediately-following socket pair is about 56 mm, center to center.

Figure 5:
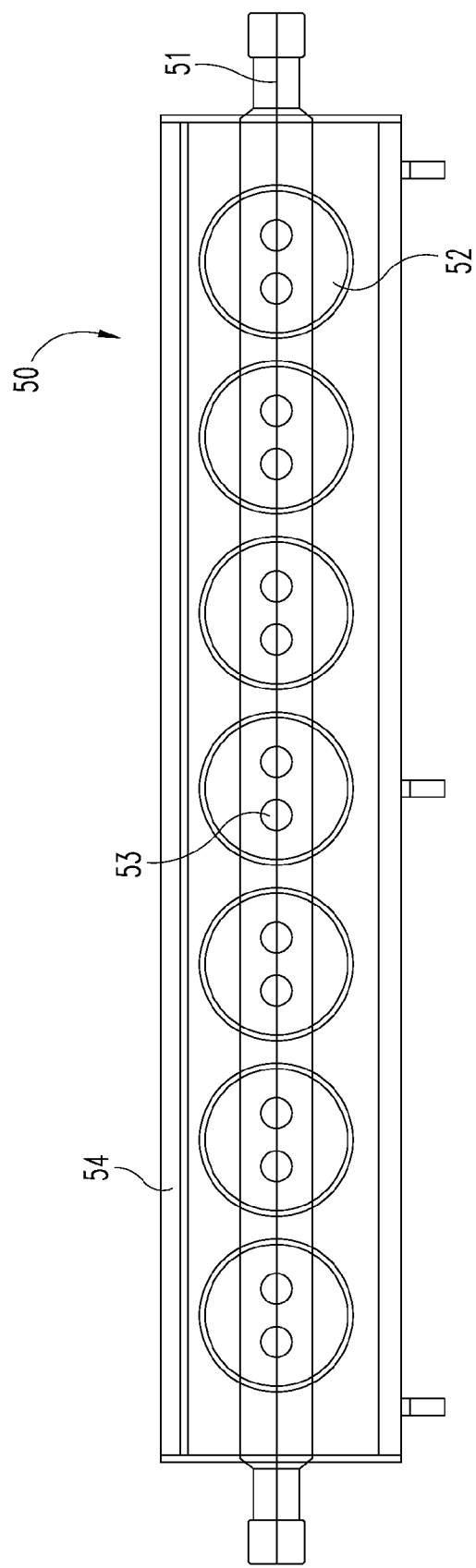
FIG. 5 is a top plan view of the header assembly, showing the header tube and associated sockets, and the header housing.
Figure 6:
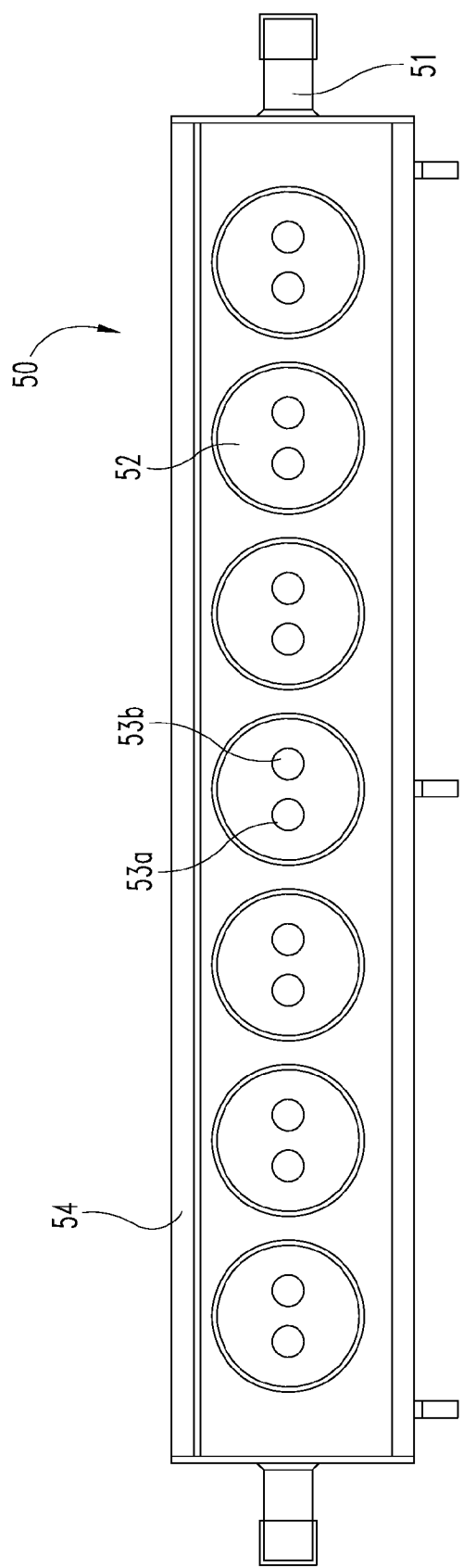
FIG. 6 is a bottom plan view of the header assembly, showing the header tube and associated sockets, and the header housing.

FIGS. 5 and 6 are top plan and bottom plan views, respectively, of the header assembly, showing the header tube and associated sockets, and the header housing. Header assembly 50 includes header tube 51 and sockets 52 for receiving the collector tubes. Sockets 53 for receiving the condenser ends of the heat pipes of the collector tubes are also provided. Sockets 53 are preferably provided in pairs 53a and 53b corresponding to the two heat pipes in each collector tube (for the two-heat-pipe embodiment). A housing 54 protects and insulates the header tube.

Figure 7:
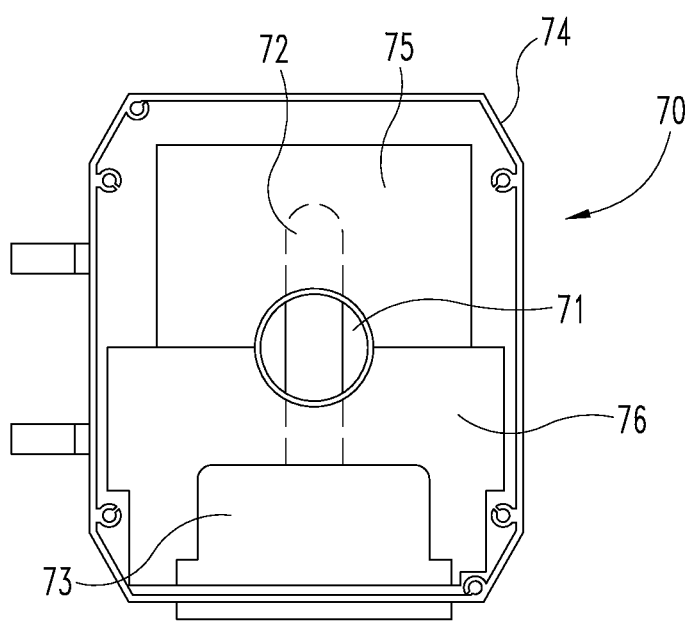
FIG. 7 is a side elevational view, in partial section, of the housing assembly of the present invention, with the header tube and insulated housing, according to one disclosed embodiment.

FIG. 7 is a side elevational view, in partial section, of the header assembly of the present invention according to one preferred embodiment, with the header tube, heat pipe socket, collector tube socket, and insulated housing being shown. Header assembly 70 includes header tube 71 passing centrally through the assembly. Heat pipe sockets 72 and collector tube sockets 73 are provided to receive heat pipes and collector tubes, respectively. Header housing 74 may include a first insulation member 75 and/or a second insulation member 76.

FIGS. 8 and 9 are front elevational and side elevational views, respectively, of the evacuated thermal collector tubes and the housing assembly of the present invention, according to one disclosed embodiment. Assembly 80 includes a plurality of collector tubes 81 with their upper ends in indirect contact with header tube 83 contained in header 82. Clips 84 may be used to retain the lower ends of collector tubes 81.

Figure 10:
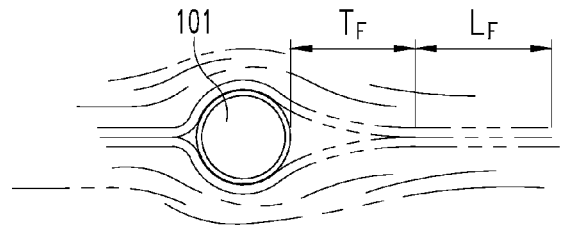
FIG. 10 is diagram showing fluid flow of a header tube fluid around a single heat pipe.

FIG. 10 is diagram showing fluid flow of a header tube fluid around a single heat pipe. As the liquid flows around pipe 101 there is a zone $T_F$ of substantially turbulent flow followed by a zone $L_F$ of substantially laminar flow.

Figure 11:
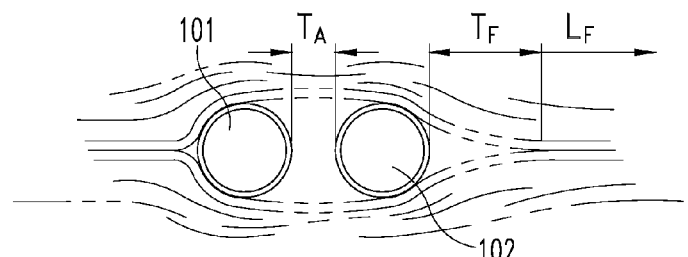
FIG. 11 is diagram showing fluid flow of a header tube fluid around a pair of heat pipes that are spaced too close together to provide optimal heat transfer.

FIG. 11 is diagram showing fluid flow of a header tube fluid around a pair of heat pipes that are spaced too close together to provide optimal heat transfer. As the liquid flows around first heat pipe 101 there is a zone $T_A$ of abbreviated flow that precedes second heat pipe 102. This abbreviated flow around second heat pipe 102 may reduce the heat transfer from the second pipe to the extent the flow is at least partially blocked by first pipe 101. A zone $L_F$ of substantially laminar flow follows second pipe 102. It is to be appreciated that the spacing is illustrative of the disclosed concept, and is not intended to represent the actual spacing that may provide the disclosed properties.

Figure 12:
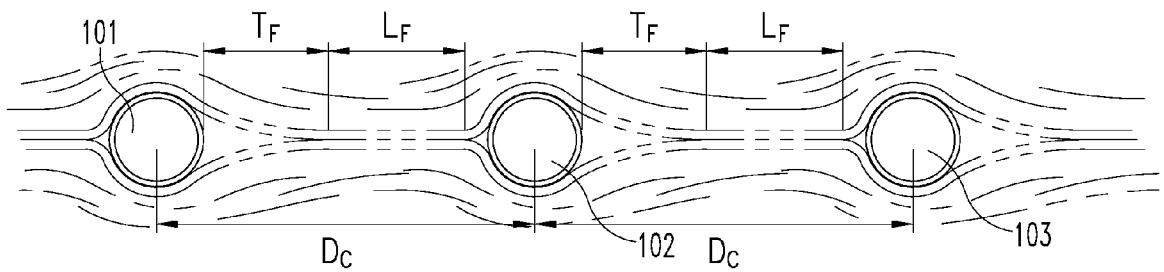
FIG. 12 is diagram showing fluid flow of a header tube fluid around a pair of heat pipes that are spaced too far apart to provide optimal heat transfer.

FIG. 12 is diagram showing fluid flow of a header tube fluid around a pair of heat pipes that are spaced too far apart to provide optimal heat transfer. As the liquid flows around first heat pipe 101 there is a zone $T_F$ of substantially turbulent flow that is followed by a zone $L_F$ of substantially laminar flow. Similarly, the flow around second heat pipe 102 has a zone $T_F$ of substantially turbulent flow that is followed by a zone $L_F$ of substantially laminar flow. It appears from testing to date that this spacing is not optimal because the flow around the second heat pipe of each heat pipe pair is not turbulent enough to facilitate good heat transfer. Here too, the illustrated spacing is intended to show the disclosed concept and is not intended to represent the actual spacing that may be needed to provide the disclosed properties.

Figure 13:
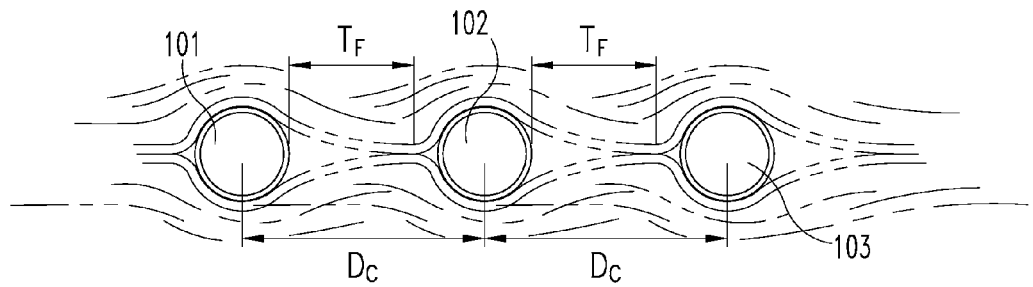
FIG. 13 is diagram showing fluid flow of a header tube fluid around a pair of heat pipes that are spaced the correct distance apart to provide optimal heat transfer.

FIG. 13 is diagram showing fluid flow of a header tube fluid around a pair of heat pipes that are spaced the correct distance apart to provide optimal heat transfer. As the liquid flows around first heat pipe 101 there is a zone $T_F$ of substantially turbulent flow that ends very near where second heat pipe 102 begins. Similarly, the flow around second heat pipe 102 has a zone $T_F$ of substantially turbulent flow that ends very near where third heat pipe 103 begins. The spacing is such that the flow between the pipes of each heat pipe pair is complete and not abbreviated. At the same time, the spacing is such that the leading heat pipe provides some turbulence around the second heat pipe of each pair. This flow pattern appears to be indicated when the spacing of the heat tube sockets, and accordingly the heat tubes, is effective to provide more efficient heat flow between the heat pipes and the header tube. As with the preceding drawings, the spacing is illustrative of the disclosed concept and is not intended to represent the actual spacing that may provide the disclosed properties.

6. Experimental Testing and Results.

Experiments were conducted to evaluate the improvement in heat transfer provided by using the heat pipe spacing of the present invention. In one experiment, two evacuated tube solar thermal collectors were provided facing due south, at a 50 degree angle. The two assemblies were tested only on full sun days, for a total of 30 days. Certified data logging equipment was used, and recorded header and bulb temperatures, with sampling every 15 minutes. All tests were performed according to SRCC requirements.

The prior art "Linuo" collector is the highest rated prior art solar thermal evacuated tube collector, as rated by the SRCC. It has thirty 58/1800 mm tubes, with a single heat pipe in each tube.

Applicant's invention was tested in the form of the "SunQuest 250" collector. That collector has twenty-five 58/1800 mm tubes, with applicant's dual heat pipe configuration and applicant's improved heat pipe spacing. In particular, the heat pipe spacing of the "SunQuest 250" collector was such that the distance between the two 14 mm condenser ends of a pair of heat pipes in a 58 mm evacuated tube was 24 mm (center-to-center). The spacing between the lead sockets of immediately-adjacent collector tubes was about 80 mm (center-to-center). The heat transfer fluid was pumped to flow through the header tube at a rate of between about 0.2 gpm and about 0.4 gpm, and more particularly at a flow rate of about 0.3 gpm.

Figure 14:
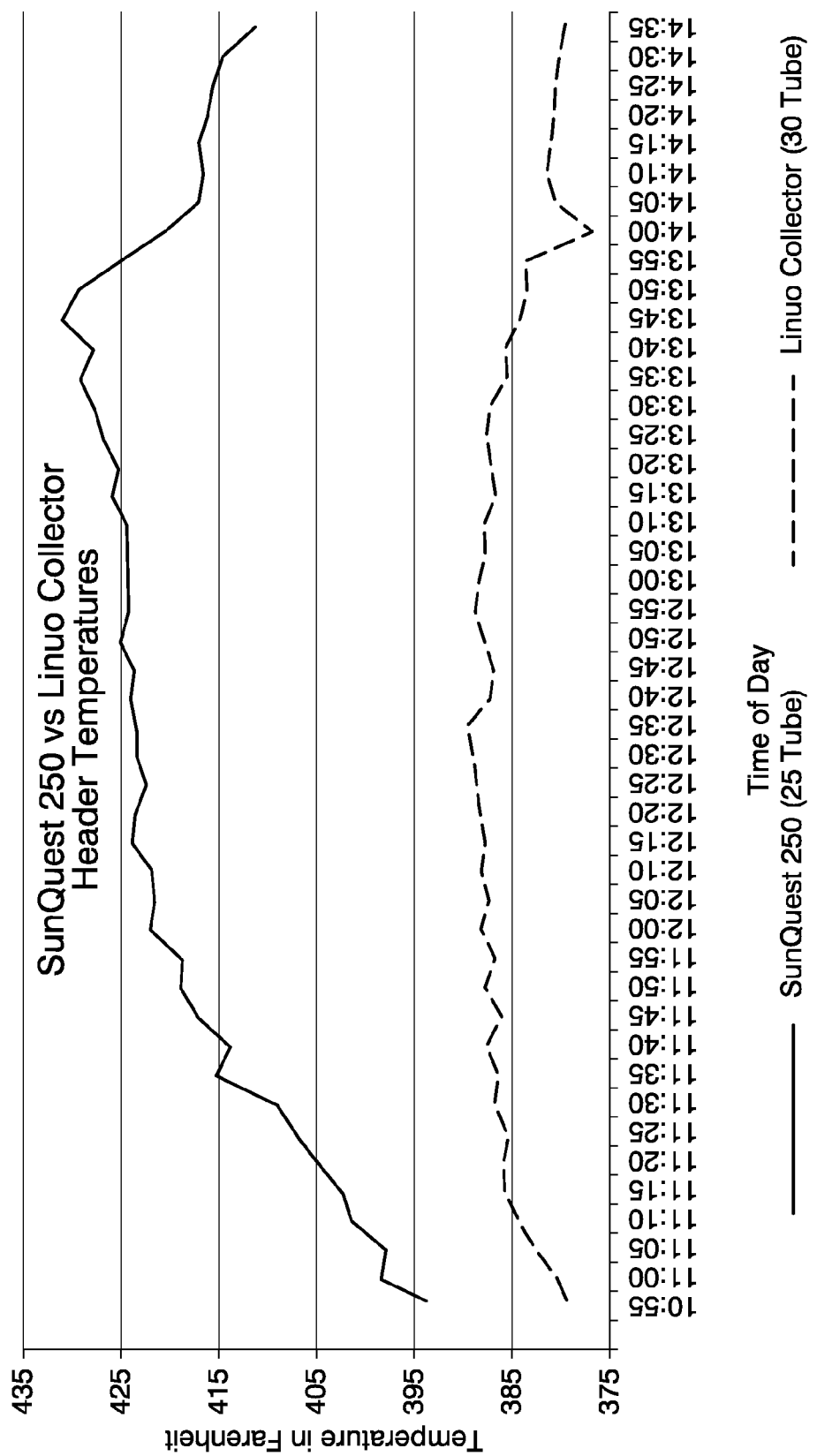
FIG. 14 is a graph of the header fluid temperatures achieved by one embodiment of the present invention, compared to the header fluid temperatures achieved by a prior art collector.

The graph of FIG. 14 shows the results. Even though applicant's collector has five fewer pipes than the prior art Linuo collector, the inventive device captured approximately 10%-15% more heat. In particular, the prior art collector using only one heat pipe per tube had an average header temperature of about 388° F., while applicant's invention using two heat pipes per tube and applicant's optimized heat pipe spacing had an average header temperature of about 425° F.

While the invention has been illustrated and described in detail in the drawings and foregoing description, the same are to be considered as illustrative and not restrictive in character, it being understood that only some embodiments have been shown and described, and that all changes and modifications that come within the spirit of the invention are desired to be protected.

What is claimed is:

1. An evacuated tube solar thermal collector, comprising a plurality of evacuated thermal collector tubes and a header tube;
wherein said evacuated thermal collector tubes each preferably comprise:
a) an outer wall,
b) an inner wall defining an inner tube space,
c) an evacuated space between said outer wall and said inner wall, wherein said evacuated space is effective to create a thermal barrier that limits heat loss from the inner tube space to the environment outside the tube, and
d) a set of two heat pipes including a first heat pipe and a second heat pipe positioned in the inner tube space in a spaced relation to each other to provide space and spacing therebetween; wherein said first and second heat pipes each comprise:
e) a pipe wall defining an inner pipe space and having an upper, condenser end and a lower, heating end, and
f) a vaporizing/condensing fluid in the inner pipe space; wherein said header tube preferably comprises:
g) a heat transfer tube being open at each end to allow a heat transfer fluid to flow therethrough,
h) a series of sockets sized to receive the condenser ends of heat pipes, and
i) a heat transfer liquid in the heat transfer tube,
wherein said sockets in the header tube are spaced so that the spacing relation between the first and second heat pipes is great enough to permit a turbulent flow of heat transfer liquid upstream of the second heat pipe, but small enough so as to not permit a substantial laminar flow of heat transfer liquid upstream of the second heat transfer pipe for optimizing the effectiveness of the heat transfer between the first and second pipes and the heat transfer fluid, and
wherein said collector tubes have an outside diameter of about 58 mm; said heat pipes have an outer diameter of about 14 mm at their condenser end; the heat transfer tube portion of said header tube has a volume of about 0.5 gallons; the spacing between the sockets for the two heat pipes of each collector tube is 24 mm (center-to-center); and the spacing between the lead sockets of immediately-adjacent collector tubes is 80 mm (center-to-center).

2. The thermal collector of claim 1 wherein said evacuated thermal collector tubes each additionally comprise a beat-absorbing material on the inner wall of each collector tube.

3. The thermal collector of claim 1 wherein said inner space of each heat pipe is at a low pressure effective to allow the vaporizing/condensing fluid in the inner space to boil at a lower temperature than it would boil if the pressure were not low.

4. The thermal collector of claim 1 wherein said header tube is covered by an insulated cover substantially surrounding the header tube and effective for limiting heat loss from the header tube to the environment.

5. A method of collecting heat energy, comprising:
a) providing an evacuated tube solar thermal collector comprising an evacuated tube solar thermal collector having a plurality of evacuated thermal collector tubes and a header tube;
wherein said thermal collector tubes each preferably comprise:
i) an outer wall;
ii) an inner wall defining an inner tube space;
iii) an evacuated space between said outer wall and said inner wall, wherein said evacuated space is effective to create a thermal barrier and cause heat absorbed by the inner wall to be retained in the inner tube space and not to be lost to the environment outside the tube; and
iv) a set of two heat pipes including a first heat pipe and a second heat pipe positioned in the inner tube space in a spaced relation to each other to provide space and spacing therebetween;

wherein said heat pipes preferably each comprise:
- (1) a pipe wall defining an inner pipe space and having an upper, condenser end and a lower, heating end, and
- (2) a heating fluid in the inner pipe space;

wherein said header tube preferably comprises:
- (A) a heat transfer tube capable of holding between about 0.4 gallons and about 0.7 gallons of a heat transfer fluid, and being open at each end to allow a heat transfer fluid to flow therethrough;
- (B) a series of sockets sized to receive the condenser ends of heat pipes including a first and second socket for respectively receiving the first and second heat pipes; and
- (C) a heat transfer liquid flowable in the heat transfer tube for transferring heat between the first and second heat pipes and the heat transfer fluid;

wherein said spacing between the first and second sockets, and thereby the first and second heat pipes is great enough to permit a turbulent flow of heat transfer liquid upstream of the second heat pipe, but small enough so as to not permit a substantial laminar flow of heat transfer liquid upstream of the second heat transfer pipe, so that sockets in the header tube are spaced for optimizing the effectiveness of the heat transfer between the first and second pipes and a heat transfer fluid; and b) flowing a heat transfer liquid through said heat transfer tube and past said first and second heat pipes at a flow rate of between about 0.2 gpm and 0.4 gpm; and wherein said collector tubes have an outside diameter of 58 mm; said heat pipes have an outer diameter of 14 mm; the heat transfer tube portion of said header tube has a volume of 0.5 gallons; the spacing between the sockets for the two heat pipes of each collector tube is 24 mm (center-to-center); and the spacing between the lead sockets of immediately-adjacent collector tubes is 80 mm (center-to-center).

6. The method of claim 5 wherein said evacuated thermal collector tubes each additionally comprise a heat-absorbing material on the inner wall of each collector tube.

7. The method of claim 5 wherein said inner space of each heat pipe is at a low pressure effective to allow the heating fluid in the inner space to boil at a lower temperature than it would boil if the pressure were not low.

8. The method of claim 5 wherein said header tube is covered by an insulated cover substantially surrounding the header tube and effective for limiting heat loss from the header tube to the environment.

* * * * *